United States Patent
Chi et al.

(10) Patent No.: US 12,327,875 B2
(45) Date of Patent: Jun. 10, 2025

(54) BATTERY PACK HAVING INTEGRATED MECHANICAL AND ELECTRICAL FIXING STRUCTURE OF BATTERY MODULES

(71) Applicant: LG ENERGY SOLUTION, LTD., Seoul (KR)

(72) Inventors: Ho-June Chi, Daejeon (KR); Kyung-Mo Kim, Daejeon (KR); Jin-Yong Park, Daejeon (KR); Jhin-Ha Park, Daejeon (KR); Jung-Hoon Lee, Daejeon (KR); Hee-Jun Jin, Daejeon (KR); Jeong-O Mun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 659 days.

(21) Appl. No.: 17/627,343

(22) PCT Filed: Aug. 5, 2020

(86) PCT No.: PCT/KR2020/010352
§ 371 (c)(1),
(2) Date: Jan. 14, 2022

(87) PCT Pub. No.: WO2021/025470
PCT Pub. Date: Feb. 11, 2021

(65) Prior Publication Data
US 2022/0263183 A1 Aug. 18, 2022

(30) Foreign Application Priority Data
Aug. 7, 2019 (KR) .................. 10-2019-0096283

(51) Int. Cl.
*H01M 50/264* (2021.01)
*H01M 10/613* (2014.01)
(Continued)

(52) U.S. Cl.
CPC ....... *H01M 50/264* (2021.01); *H01M 10/613* (2015.04); *H01M 10/6568* (2015.04);
(Continued)

(58) Field of Classification Search
CPC ............ H01M 50/264; H01M 10/613; H01M 10/6568; H01M 50/211; H01M 50/271; H01M 50/517
(Continued)

(56) References Cited

U.S. PATENT DOCUMENTS

2012/0189887 A1\* 7/2012 Hohenthanner .... H01M 10/486
429/247
2014/0017538 A1\* 1/2014 Nakamori ........... H01M 50/271
429/99
(Continued)

FOREIGN PATENT DOCUMENTS

CN 203589107 U 5/2014
CN 106575729 A 4/2017
(Continued)

OTHER PUBLICATIONS

International Search Report (PCT/ISA/210) issued in PCT/KR2020/010352, dated Nov. 24, 2020.
(Continued)

*Primary Examiner* — Ekandra S. Miller-Cruz
*Assistant Examiner* — Kevin Nguyen
(74) *Attorney, Agent, or Firm* — Birch, Stewart, Kolasch & Birch, LLP (57) ABSTRACT

Disclosed is a battery pack, which includes a plurality of battery modules and a pack case for fixedly installing the battery modules therein, and the pack case includes a pack tray supporting a lower portion of the battery modules; and a pack cover coupled with the pack tray to cover the battery modules and having a terminal connection unit coupled to at
(Continued)

least one side of each battery module and provided to an inner surface of a top thereof to electrically connect electrode terminals of the battery modules.

15 Claims, 7 Drawing Sheets

(51) Int. Cl.
  *H01M 10/6568* (2014.01)
  *H01M 50/211* (2021.01)
  *H01M 50/271* (2021.01)
  *H01M 50/517* (2021.01)
(52) U.S. Cl.
  CPC ....... *H01M 50/211* (2021.01); *H01M 50/271* (2021.01); *H01M 50/517* (2021.01)
(58) Field of Classification Search
  USPC .......................................................... 429/99
  See application file for complete search history.

(56) References Cited

U.S. PATENT DOCUMENTS

| | | | |
|---|---|---|---|
| 2016/0043446 A1 | 2/2016 | Fritz et al. | |
| 2016/0134000 A1* | 5/2016 | Lee ..................... | H01M 50/209 429/120 |
| 2017/0288183 A1 | 10/2017 | Sakai et al. | |
| 2018/0013111 A1 | 1/2018 | Wuensche et al. | |
| 2018/0261992 A1* | 9/2018 | Bower ................ | H01M 50/512 |
| 2019/0305282 A1 | 10/2019 | Jeon | |
| 2019/0326582 A1* | 10/2019 | Berels ..................... | B60K 1/04 |
| 2020/0067156 A1 | 2/2020 | Chi et al. | |
| 2021/0194100 A1 | 6/2021 | Keum | |

FOREIGN PATENT DOCUMENTS

| | | | | |
|---|---|---|---|---|
| JP | 4-286862 A | | 10/1992 | |
| JP | 2011-165628 A | | 8/2011 | |
| JP | 2013-541314 A | | 11/2013 | |
| JP | 2015-149213 A | | 8/2015 | |
| JP | 2017-112032 A | | 6/2017 | |
| KR | 10-2013-0073311 A | | 7/2013 | |
| KR | 10-2014-0130357 A | | 11/2014 | |
| KR | 2016050492 A | * | 5/2016 | .......... H01M 10/486 |
| KR | 10-2016-0068446 A | | 6/2016 | |
| KR | 10-1674991 B1 | | 11/2016 | |
| KR | 10-2017-0038497 A | | 4/2017 | |
| KR | 10-2018-0010576 A | | 1/2018 | |
| KR | 10-2018-0091441 A | | 8/2018 | |
| KR | 10-1909215 B1 | | 10/2018 | |
| WO | WO 2018/186566 A1 | | 10/2018 | |
| WO | WO 2019/078553 A1 | | 4/2019 | |

OTHER PUBLICATIONS

Extended European Search Report for corresponding European Application No. 20849188.6, dated Mar. 6, 2023.

* cited by examiner

FIG. 1

Conventional Art

BATTERY PACK HAVING INTEGRATED MECHANICAL AND ELECTRICAL FIXING STRUCTURE OF BATTERY MODULES

TECHNICAL FIELD

The present disclosure relates to a battery pack, and more particularly, to a battery pack having an integrated mechanical and electrical fixing structure of battery modules.

The present application claims priority to Korean Patent Application No. 10-2019-0096283 filed on Aug. 7, 2019 in the Republic of Korea, the disclosures of which are incorporated herein by reference.

BACKGROUND ART

A secondary battery refers to a battery that may be charged and discharged, unlike a primary battery that cannot be charged, and the secondary battery is used as a power source not only for small high-tech electronics such as a mobile phone, a PDA or a laptop computer but also for an energy storage system (ESS), an electric vehicle (EV) or a hybrid electric vehicle (HEV).

Currently widely used secondary batteries include lithium ion batteries, lithium polymer batteries, nickel cadmium batteries, nickel hydrogen batteries, nickel zinc batteries, and the like. An operating voltage of a unit secondary battery cell, namely a unit battery cell, is about 2.5V to 4.2V. Therefore, if higher output voltage and greater energy capacity are required, a plurality of battery cells are connected in series to configure a battery module, or two or more battery modules are connected in series or in parallel and other components are added to configure a battery pack. For example, the battery module may refer to a device in which a plurality of secondary batteries are connected in series or in parallel, and the battery pack may refer to a device in which battery modules are connected in series or in parallel to increase capacity and output.

In addition to the battery modules, the battery pack may further include a cooling device for properly maintaining the temperature of the battery modules, a control device for monitoring the operating state of the battery modules, and a pack case for packaging them.

Meanwhile, in the case of a battery pack for an electric vehicle, since the installation space of the battery pack is limited depending on the overall length and width of the electric vehicle, it is important to increase the energy density by mounting battery modules and other components inside the pack case as space-efficiently as possible.

Figure 1:
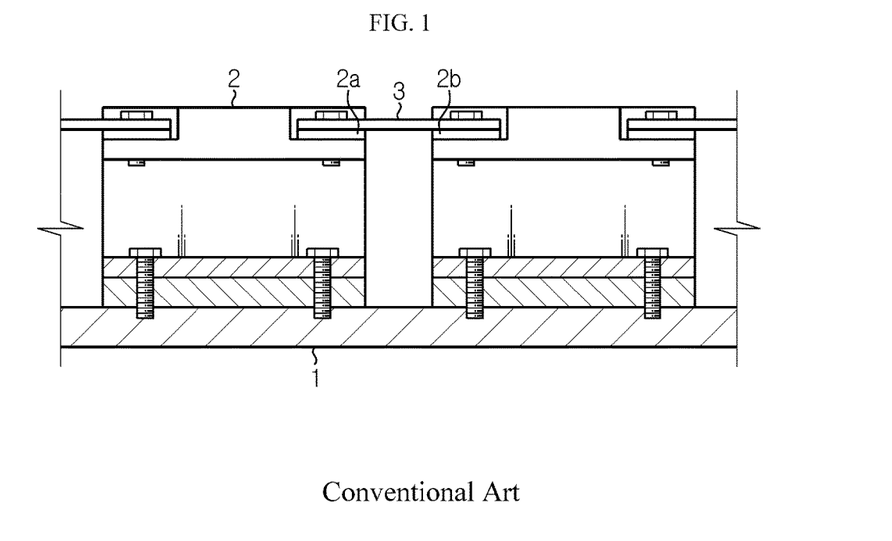
FIG. 1 is a diagram schematically showing an example in which a conventional battery pack is assembled.

When assembling the battery pack, in the conventional case, as shown in FIG. 1, battery modules 2 are disposed on an upper surface of a pack tray 1, which corresponds to a bottom surface of the pack case, and a bolt is fastened to the pack tray 1 to mechanically fix the battery modules 2. In general, most battery modules 2 are fixed to the upper surface of the pack tray 1 by inserting long bolts in four locations at front and rear corners thereof. As an electrical connection structure between the battery modules, in many cases, both ends of the an inter-bus bar 3 having a metal bar shape are placed on the upper surface of a positive electrode terminal 2a of one battery module 2 and a negative electrode terminal 2b of another battery module 2, and they are fixed using two bolts. There are many examples where a heatsink for cooling is further disposed under each of the battery modules 2.

However, some problems have recently been pointed out on the assembly structure of the conventional battery pack. Among them, since too many bolts are used to fix the battery modules and inter-bus bars, the assembly process is inefficient and the cost increases. Also, since a large number of bolting points are required on the pack tray, the utilization rate of the lower space of the pack case deteriorates (when the heatsink is installed below the battery module, the bolt fastening structure may be interfered, which makes the cooling water inflow and outflow line complicated).

Therefore, the development of a battery pack to which an assembly structure capable of solving the above problems is applied is becoming an issue.

DISCLOSURE

Technical Problem

The present disclosure is designed to solve the problems of the related art, and therefore the present disclosure is directed to providing a battery pack, which may improve the energy density and the degree of freedom of space for mounting battery modules and other components by simplifying the mechanical fixing and electrical connecting structure of the battery modules inside a pack case and also enhancing the space utilization.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, which comprises a plurality of battery modules and a pack case for fixedly installing the battery modules therein, wherein the pack case includes: a pack tray configured to support a lower portion of the battery modules; and a pack cover coupled with the pack tray to cover the battery modules and having a terminal connection unit coupled to at least one side of each battery module and provided to an inner surface of a top of the pack cover to electrically connect electrode terminals of the battery modules.

The battery modules may be configured such that, when an upper portion of the battery modules is covered by the pack cover, an electrode terminal of a first battery module among the battery modules and an electrode terminal of a second battery module among the battery modules adjacent to the first battery module make contact with the terminal connection unit in upper and lower directions, respectively, to be electrically connected.

Each of the battery modules may include battery cells and a module case for accommodating the battery cells, and the electrode terminals may have a rectangular plate shape and may be provided to protrude on one side of the module case of the respective battery module.

Each module case may include a terminal support formed to protrude on one side thereof to support a lower portion of the electrode terminals, the terminal support having a perforated hole formed in a vertical direction.

The pack cover may further include a mounting nut provided at the inner surface of the top of the pack cover, and each battery module may be fixed to the pack cover by a mounting bolt that is inserted into the perforated hole of the respective terminal support and fastened to the mounting nut in a vertical direction.

The electrode terminals may be located above the perforated hole of the respective terminal support and configured so that the mounting bolt passes therethrough.

At least one of the mounting bolts and the mounting nuts may be made of an insulating material.

The terminal connection unit may include an inter-bus bar configured to make a surface contact with the electrode terminals and having a fastening hole through which the mounting bolts pass; and a bracket member configured to support the inter-bus bar and fixedly coupled to the inner surface of the pack cover.

The bracket member may be shape-fitted with the mounting nut and attached to the inner surface of the pack cover.

The module case may include a base plate located at a lower portion of the battery cells to support the battery cells, and the base plate has a flow path provided therein so that a coolant flows therethrough.

The pack cover may further include a cooling pipe embedded therein along an edge region thereof, the base plate may include a cooling water port configured to communicate with the flow path and formed to extend vertically, and the cooling water port may be directly connected to the cooling pipe in an upper and lower direction.

The plurality of battery modules may be arranged in two rows such that electrode terminals thereof are disposed to face each other based on a center portion of the pack case.

In another aspect of the present disclosure, there is also provided a vehicle, comprising the battery pack described above. The vehicle may include an electric vehicle (EV) or a hybrid electric vehicle (HEV).

Advantageous Effects

According to an embodiment of the present disclosure, the fastening structure may be simplified by integrating the mechanical fixing and electrical connecting structure of the battery modules in the pack case.

According to another embodiment of the present disclosure, the space utilization rate and the degree of freedom on the pack tray may be increased since the battery modules are fastened and fixed on the pack cover.

According to still another embodiment of the present disclosure, by using the top cover and the base plate of the module case as a cooling water circulation space, it is possible to simplify the configuration of the cooling device and improve the energy density.

Other effects of the present disclosure may be understood by the following description and will be more clearly figured out by the embodiments of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 2:
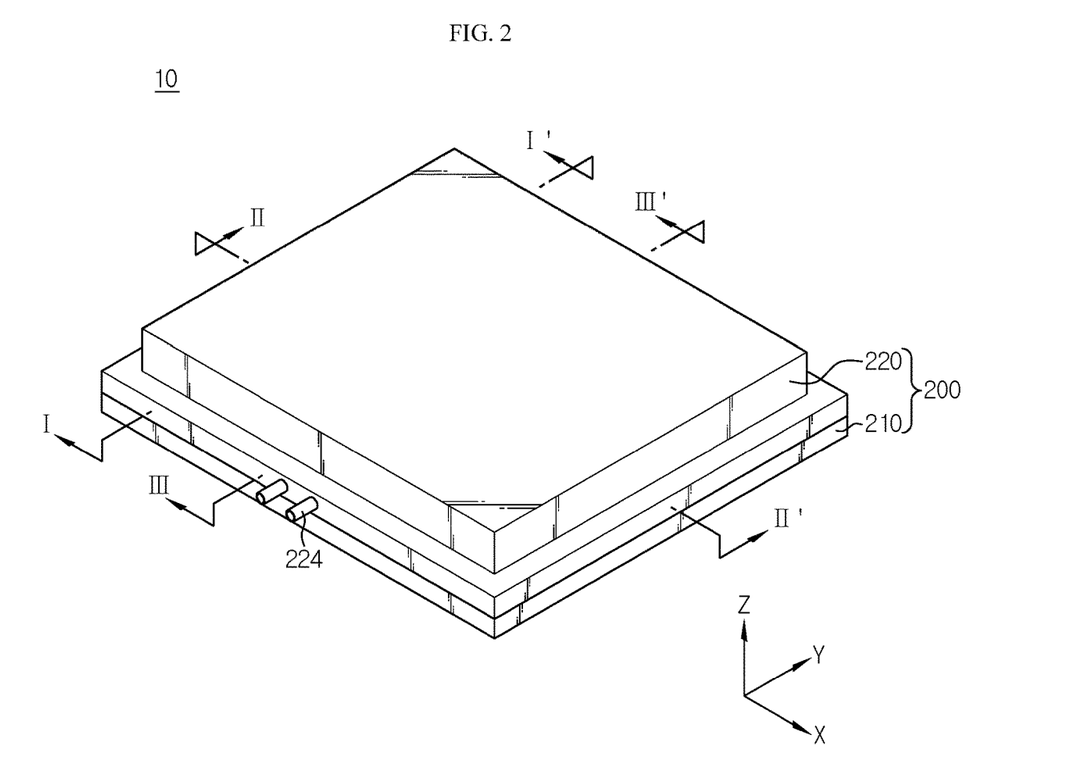
FIG. 2 is a perspective view schematically showing a battery pack according to an embodiment of the present disclosure.
Figure 3:
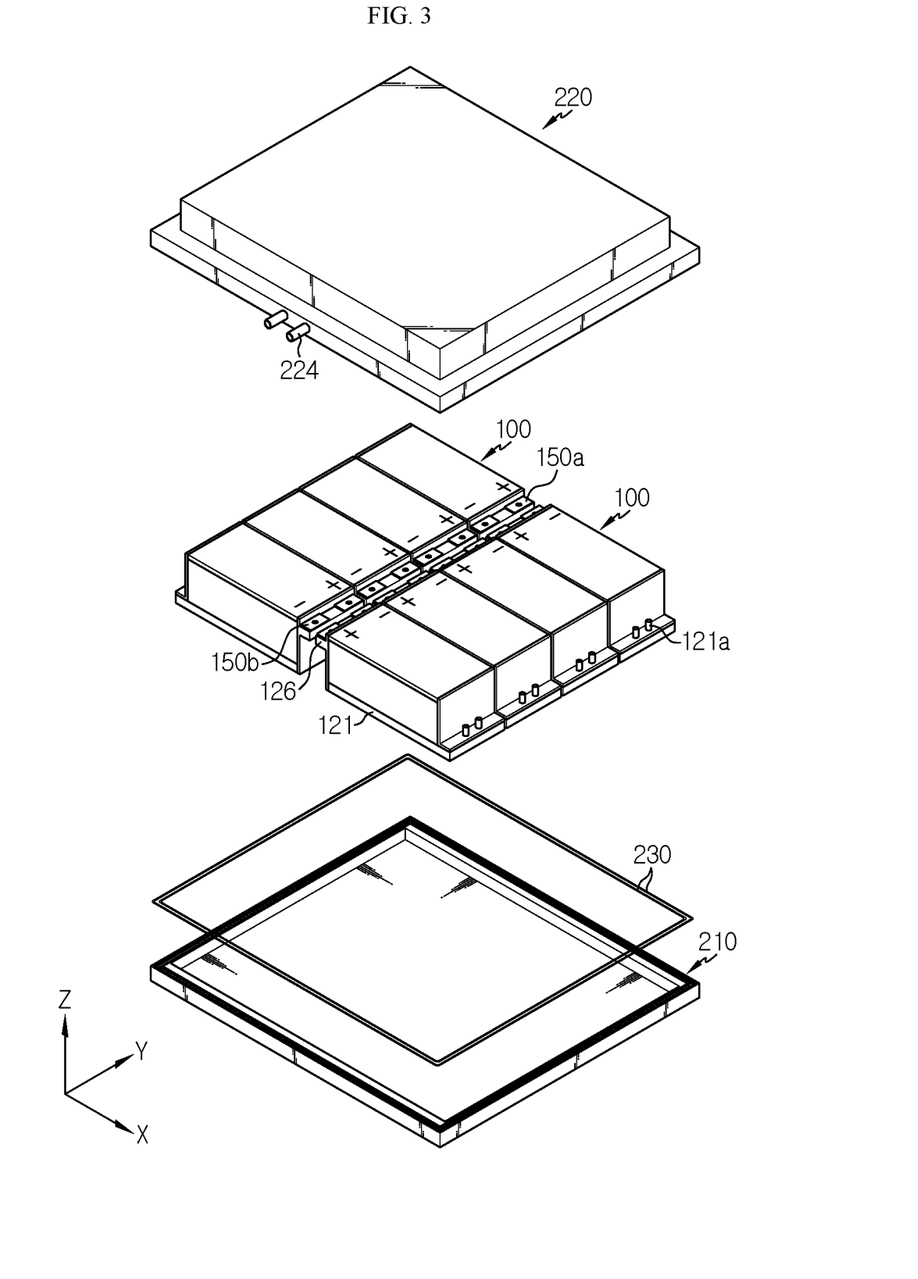
FIG. 3 is a partially exploded perspective view showing the battery pack of FIG. 2.
Figure 4:
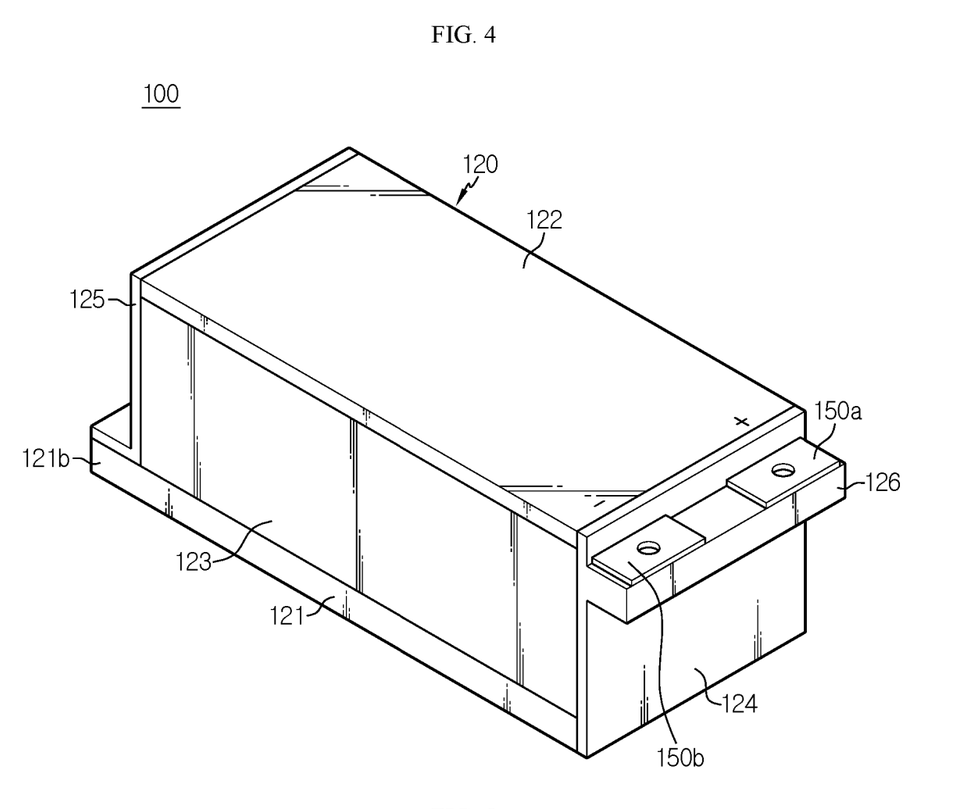
FIG. 4 is a perspective view schematically showing a battery module according to an embodiment of the present disclosure.

FIG. 2 is a perspective view schematically showing a battery pack according to an embodiment of the present disclosure, FIG. 3 is a partially exploded perspective view showing the battery pack of FIG. 2, and FIG. 4 is a perspective view schematically showing a battery module according to an embodiment of the present disclosure.

Referring to these drawings, a battery pack 10 according to an embodiment of the present disclosure includes a plurality of battery modules 100 and a pack case 200 for accommodating the battery modules 100. The pack case 200 includes a pack tray 210 for supporting a lower portion of the plurality of battery modules 100, and a pack cover 220 coupled with the pack tray 210 to cover the entire battery modules 100.

As will be described later, the battery pack 10 according to the present disclosure may reduce the number of fastening parts and fastening points, and is configured to mechanically fix and electrically connect the battery modules 100 to the pack cover 220 at the same time in order to improve the space utilization rate or the space freedom of the pack tray 210.

Among the main components of the battery pack 10, each battery module 100 will be described first.

The battery module 100 includes battery cells 110, a module case 120 for accommodating the battery cells 110 in an inner space thereof, and electrode terminals 150a, 150b exposed at an outer side of the module case 120.

The battery cells 110 are pouch-type secondary battery cells widely known in the art. The pouch-type secondary battery cells may be stacked in the inner space of the module case, which is advantageous in increasing energy density. Of course, the battery cell 110 is not necessarily limited to the pouch-type battery cell 110. For example, it is possible to use a cylindrical secondary battery cell or a prismatic secondary battery cell instead of the pouch-type secondary battery cell.

Figure 5:
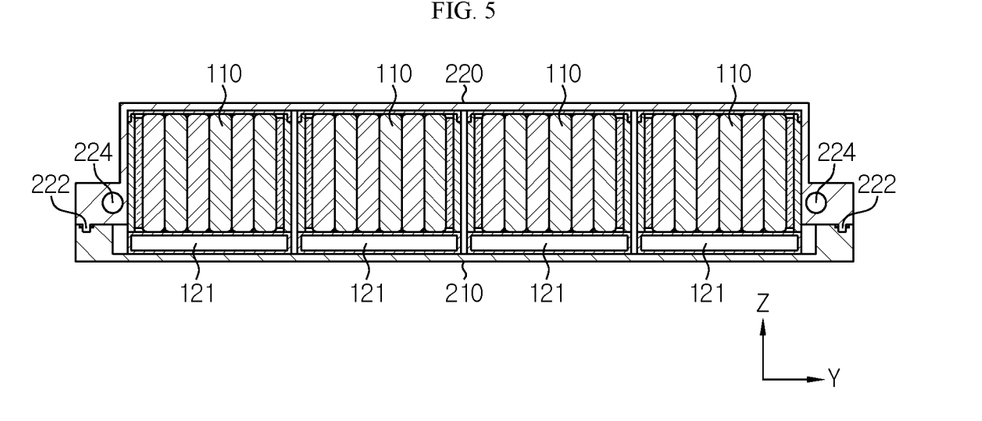
FIG. 5 is a schematic sectional view, taken along the line I-I' of FIG. 2.

As shown in FIGS. 4 and 5, the module case 120 may include a base plate 121 and a top plate 122 for covering lower and upper portions of the battery cells 110, respectively, a pair of side plates 123 arranged at the outermost part of the battery cells 110 according to an arrangement direction thereof, and a front cover 124 and a rear cover 125 for covering front and rear sides of the battery cells 110, respectively.

In particular, the base plate 121, which forms a bottom surface of the module case 120, functions like a conventional heatsink. For example, a flow path through which a cooling water may flow is provided inside the base plate 121 so that the base plate 121 may directly cool the battery cells 110, and a cooling water port 121a is provided at an edge of the base plate 121 to allow the cooling water to flow into and out of the flow path.

The cooling water port 121a may extend vertically from one side of the edge of the base plate 121 to be directly connected to a cooling pipe of the pack cover 220, explained later. By means of the cooling water supplying and discharging structure, a cooling water may be supplied to the base plate 121 of each battery module 100.

A conventional battery pack 10 mostly has a cooling configuration in which a heat conduction pad and a heatsink are sequentially arranged under the battery module 100. However, in the present disclosure, the heatsink is incorporated to the base plate 121 of the module case 120, thereby reducing the heat transfer path, decreasing the number of parts, and saving the installation space of the cooling device, compared to the conventional art.

The front cover 124 and the rear cover 125 are located at the front of the battery cells 110 so that the electrode leads of the battery cells 110 or components such as an inter connection board (ICB) are not exposed to the outside. The electrode terminals 150a, 150b include a positive electrode terminal 150a and a negative electrode terminal 150b, are located at an outer side of the top of the front cover 124 to have a rectangular plate shape so that its wide surface is placed horizontally, and have holes formed therein so that bolts may be inserted in upper and lower directions.

The electrode terminals 150a, 150b may be placed on and supported by a terminal support 126. Here, the terminal support 126 is a part protruding from the front cover 124 and may be used as a place where a lower portion of the electrode terminals 150a, 150b is supported and a bolt of the battery module 100 is fastened.

The terminal support 126 may be provided to extend along a width direction of the front cover 124, and in a place where the positive electrode terminal 150a and the negative electrode terminal 150b are located, one perforated hole into which a bolt may be inserted may be formed in a vertical direction. The perforated hole is not shown in the drawings, but may be formed to coincide with the hole of the electrode terminals 150a, 150b in upper and lower directions.

For reference, although the front cover 124 and the terminal support 126 are described separately, they may be manufactured in an integral type. In addition, although not shown, a perforated hole may be provided such that a mounting bolt 201 is inserted in another place where the electrode terminals 150a, 150b are not located. In this way, the mounting bolt 201 may be fastened to the pack cover 220.

The pair of side plate 123 may serve to compress and support the battery cells 110 from the outside at the outermost battery cell 110 along the arrangement direction of the battery cells 110.

Next, with reference to FIGS. 5 to 11, a mechanical fixing and electrical connection structure for each of the battery modules 100 inside the pack case 200 will be described in detail.

The cooling structure of the battery pack 10 according to the present disclosure will be described first.

Basically, the battery pack 10 of the present disclosure is a water-cooling type, and a cooling water is supplied to each battery module 100 while circulating along the rim of the pack cover 220.

In particular, in the battery module 100 of the present disclosure, the heatsink serves as a part of the module case 120, namely plays a role of the base plate 121. In other words, as shown in FIG. 5, the base plate 121 having the flow path through which the cooling water may flow is configured as the bottom surface of the module case 120.

A cooling pipe 224 for supplying the cooling water to each battery module 100 is embedded in the pack cover 220 along an edge region of the pack cover 220, and may be vertically connected to the cooling water port 121a of each battery module 100.

Figure 6:
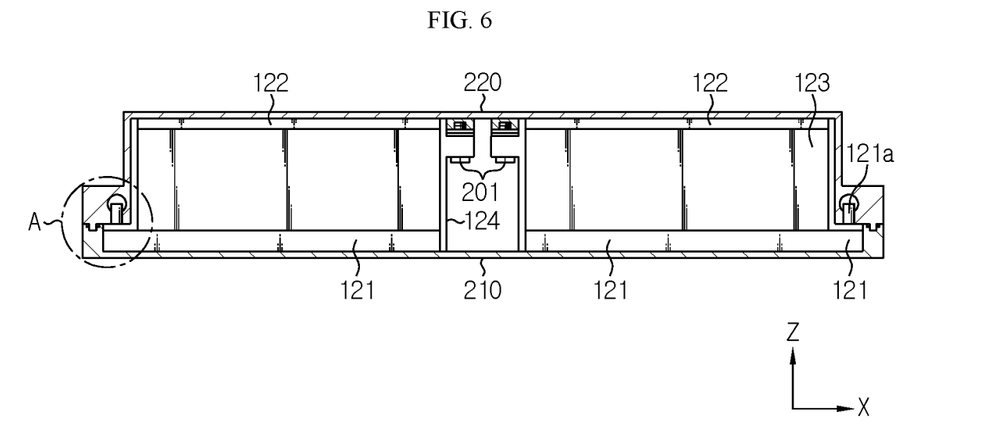
FIG. 6 is a schematic sectional view, taken along the line II-II' of FIG. 2.
Figure 7:
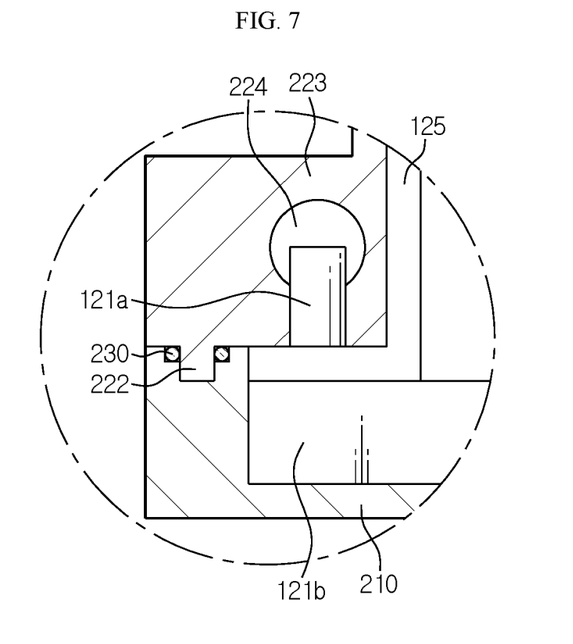
FIG. 7 is an enlarged view showing a region A of FIG. 6.

Specifically, as shown in FIGS. 6 to 7, the pack cover 220 includes an uneven portion 222 fitted into the edge of the pack tray 210 and a cooling pipe mounting portion 223 extending from the uneven portion 222 into the pack cover 220.

An O-ring 230 made of rubber and configured to reinforce the sealing property may be further interposed at the bonding portion between the pack cover 220 and the pack tray 210.

The cooling pipe 224 may be located inside the cooling pipe mounting portion 223. As an alternative embodiment, the cooling pipe may be excluded by forming a region of the cooling pipe mounting portion 223 in a hollow structure.

The base plate 121 of each battery module 100 includes a port assembling portion 121b configured to extend outward further based on a vertical surface of the rear cover 125. The cooling water port 121a may be vertically mounted to the port assembling portion 121b.

The port assembling portion 121b is located directly below the cooling pipe mounting portion 223 of the pack cover 220 so that the cooling water port 121a may be directly connected to the cooling pipe of the pack cover 220. Although not shown, a fixing connector and a sealing member may be further used to secure fastening and sealing properties between the cooling water port 121a and the cooling pipe.

With this configuration, the cooling water may be supplied to the base plate 121 of each battery module 100 while circulating in the circumferential direction of the pack cover 220 along the cooling pipe 224 of the pack cover 220.

In particular, in the present disclosure, since the cooling pipe 224 is included in the pack cover 220 and the cooling water port 121a of the base plate 121 is simply connected to the cooling pipe 224 by the shortest distance, components such as additional connection pipes or hoses for supplying the cooling water are not necessary. In addition, since there is no connection pipe or hose on the pack tray 210, the battery module 100 and other electronic components may be mounted more easily.

Next, the mechanical fixing and electrical connecting structure of the battery pack 10 of the present disclosure will be described with reference to FIGS. 8 to 11.

In this embodiment, eight battery modules 100 may be accommodated in total inside the pack case 200, namely four battery modules in each of two rows. At this time, the group of the battery modules 100 in the first row and the group of the battery modules 100 in the second row (see FIG. 3) may be located such that the electrode terminals 150a, 150b thereof face each other based on a center portion of the pack case 200. This arrangement of the battery modules 100 may be advantageous in minimizing the electrical connection distance between the battery modules 100. Of course, such an arrangement of the battery modules 100 is an example, and the total number or arrangement structure of the battery modules 100 may be changed as desired.

The eight battery modules 100 may be placed on the bottom of the pack tray 210 and supported thereby, and may be fixed to the terminal connection unit 221 provided at the inner surface of the top of the pack cover 220 by bolting. Moreover, the electrode terminals 150a, 150b of adjacent battery modules 100 may contact the terminal connection unit 221 to be electrically connected to each other.

For example, when the upper portion of the module case 120 is covered by the pack cover 220, the electrode terminals 150a, 150b of one battery module 100 and the electrode terminals 150a, 150b of another battery module 100 may be electrically connected to each other by making contact with the terminal connection unit 221 in upper and lower directions.

Figure 8:
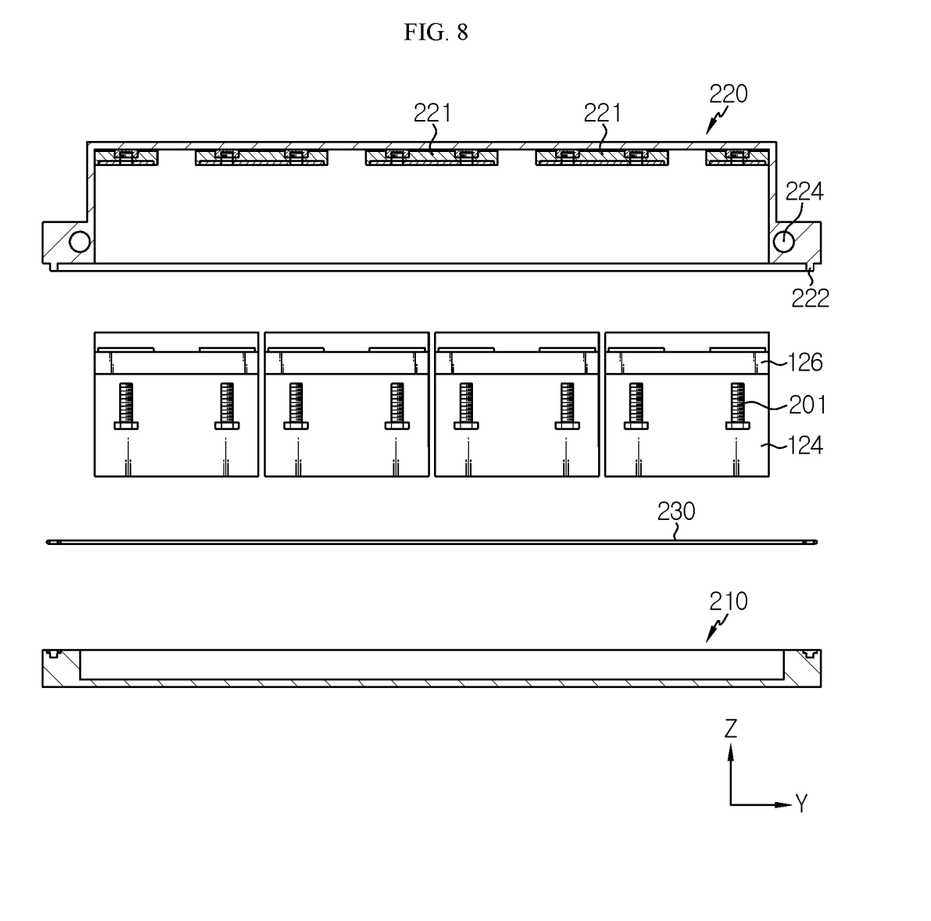
FIG. 8 is an exploded sectional view, taken along the line III-III' of FIG. 2.
Figure 9:
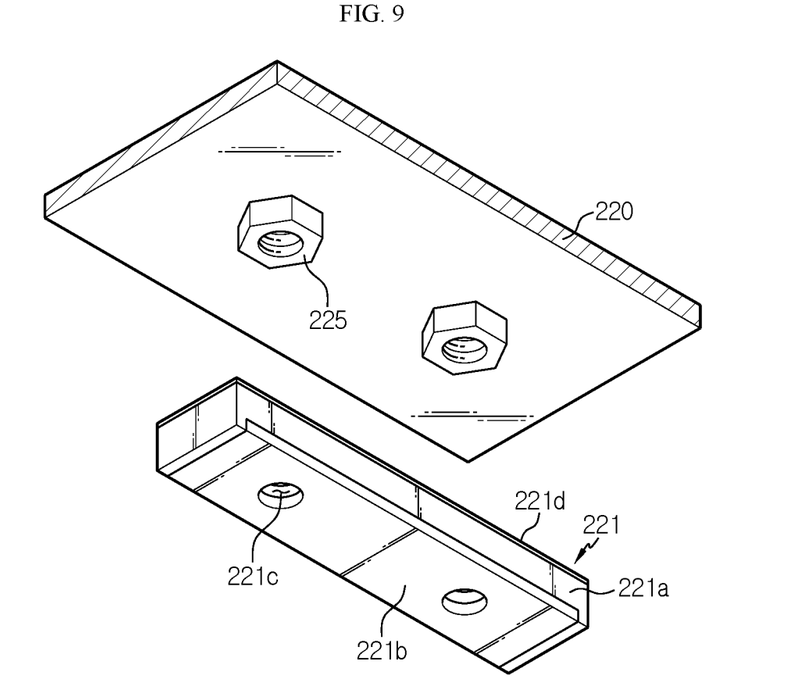
FIG. 9 is a schematic perspective view showing a terminal connection unit and a mounting nut according to an embodiment of the present disclosure.

As shown in FIGS. 8 and 9, the pack cover 220 may further include a mounting nut 225 at an inner surface of the top thereof. The mounting nut 225 may be attached to the pack cover 220 in advance by welding. The terminal connection unit 221 is shape-fitted with the mounting nut 225 and be attached to the pack cover.

The terminal connection unit 221 has a metal bar-shaped inter-bus bar 221b having a fastening hole 221c through which the mounting bolt 201 may pass and making surface contact with the electrode terminals 150a, 150b of the battery module 100, and a bracket member 221a made of an insulating material that supports the inter-bus bar 221b and is fixedly coupled to the inner surface of the top of the pack cover 220.

Figure 10:
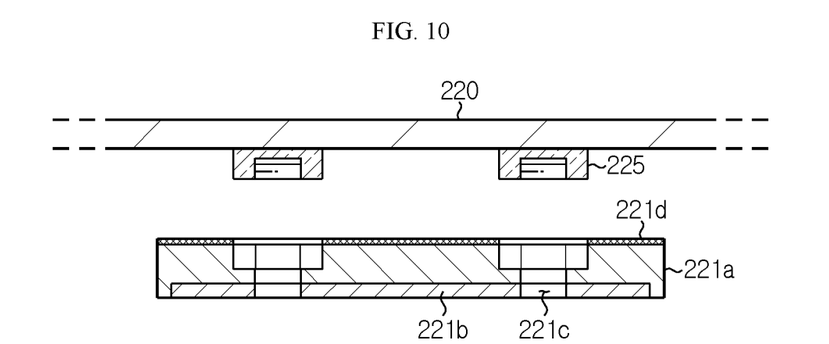
FIG. 10 is a sectional view corresponding to FIG. 9.

The bracket member 221a has a rear surface shape-fitted with the mounting nut 225, and a front surface of the bracket member 221a is provided such that the inter-bus bar 221b is detachably attached thereto, so that the fastening hole 221c of the inter-bus bar 221b and the mounting nut 225 are coincided with each other in upper and lower directions.

The bracket member 221a may be simply attached to the pack cover 220 by attaching a both-sided adhesive tape 221d to a rear surface thereof. Of course, the bracket member may also be attached in other ways, such as bolt and nut combination.

Figure 11:
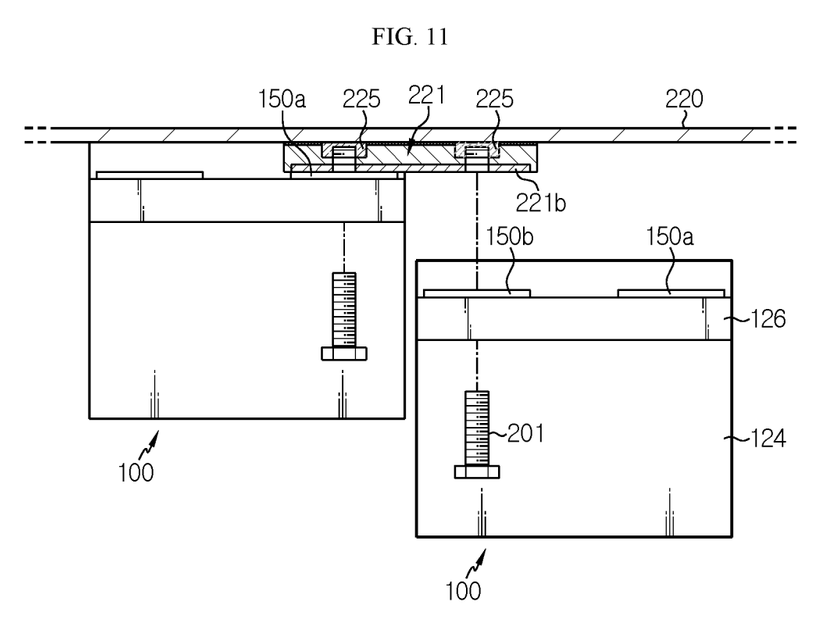
FIG. 11 is a diagram for illustrating a structure for fixing and electrically connecting battery modules according to an embodiment of the present disclosure.

With this configuration, as shown in FIG. 11, each battery module 100 may be fixed to the pack cover 220 by fastening the mounting bolt 201 to the mounting nut 225 from the perforated hole of the terminal support 126 through the holes of the electrode terminals 150a, 150b and the fastening hole 221c of the inter-bus bar 221b. At this time, two adjacent battery modules 100 may be electrically connected to each other because the positive electrode terminal 150a and the negative electrode terminal 150b contact the inter-bus bar 221b of the terminal connection unit 221, respectively.

At least one of the mounting bolt 201 and the mounting nut 225 may be an insulation bolt and an insulation nut. By using the insulation bolt and the insulation nut, a short circuit may be prevented even if the battery modules 100 are mechanically fixed and electrically connected to the pack cover 220 simultaneously.

As described above, the battery pack 10 of the present disclosure may be assembled very easily since the mechanical fixing and electrical connection structure of the battery modules 100 is integrated. In addition, by fixing each battery module 100 to the pack cover 220 instead of fixing the same on the pack tray 210 with bolts, the space utilization rate or the degree of freedom of the pack tray 210 may be improved.

Finally, an example where the battery pack 10 of the present disclosure is assembled will be described briefly as follows.

As for the battery pack 10 of the present disclosure, it is preferable to turn the pack cover 220 upside down, place the battery modules 100 therein, and then fix them, contrary to the assembly method of a general battery pack 10.

That is, in a state where the pack cover 220 is turned upside down, each battery module 100 is positioned so that the cooling water port 121a and the electrode terminals 150a, 150b of the battery module 100 access or contact the cooling pipe of the pack cover 220 and the terminal connection unit 221, respectively.

After that, the mounting bolt 201 is fastened to a fastening part between each battery module 100 and the pack cover 220. As described above, by placing each battery module 100 at a predetermined position and fastening the mounting bolt 201 thereto, the mechanical fixing work and the serial and/or parallel connection work of the battery modules 100 may be easily solved at once.

Then, an O-ring is interposed in an uneven portion 222 of the pack cover 220, and the uneven portion 222 is fitted into an edge portion of the pack tray 210, thereby completing a main assembly process.

Meanwhile, the battery pack according to the present disclosure described above may further include various devices for controlling charging and discharging of the battery modules, such as a BMS, a current sensor and a fuse. The battery pack may be applied not only to vehicles such as electric vehicles or hybrid electric vehicles. Of course, the battery pack 10 may be applied to energy storage systems or other IT products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A battery pack, which comprises a plurality of battery modules and a pack case for fixedly installing the battery modules therein,
    wherein the pack case includes:
    a pack tray configured to support a lower portion of the battery modules; and
    a pack cover coupled with the pack tray to cover the battery modules and having a terminal connection unit attached to at least one side of each battery module at a first side by a fastener and attached to an inner surface of a top of the pack cover at a second side opposite to the first side by the fastener to electrically connect electrode terminals of the battery modules.

2. The battery pack according to claim 1,
    wherein the battery modules are configured such that, when an upper portion of the battery modules is covered by the pack cover, an electrode terminal of a first battery module among the battery modules and an electrode terminal of a second battery module among the battery modules, adjacent to the first battery module, make contact with the terminal connection unit in upper and lower directions, respectively, to be electrically connected.

3. The battery pack according to claim 1,
wherein each of the battery modules includes battery cells and a module case for accommodating the battery cells, and
wherein the electrode terminals have a rectangular plate shape and are provided to protrude on one side of the module case of the respective battery module.

4. The battery pack according to claim 3,
wherein each module case includes a terminal support formed to protrude on one side thereof to support a lower portion of the electrode terminals, the terminal support having a perforated hole formed in a vertical direction.

5. The battery pack according to claim 4,
wherein the pack cover further includes a mounting nut attached to the inner surface of the top of the pack cover,
wherein each battery module is fixed to the pack cover by a mounting bolt that is inserted into the perforated hole of the respective terminal support and fastened to the mounting nut in a vertical direction,
wherein the terminal connection unit is interposed between the mounting nut and the mounting bolt, and
wherein the fastener includes the mounting nut and the mounting bolt.

6. The battery pack according to claim 5,
wherein the electrode terminals are located above the perforated hole of the respective terminal support and configured so that the mounting bolt passes therethrough.

7. The battery pack according to claim 5,
wherein at least one of the mounting bolts and the mounting nuts is made of an insulating material.

8. The battery pack according to claim 6,
wherein the terminal connection unit includes:
an inter-bus bar configured to make a surface contact with the electrode terminals and having a fastening hole through which the mounting bolts pass; and
a bracket member configured to support the inter-bus bar and fixedly coupled to the inner surface of the pack cover.

9. The battery pack according to claim 8,
wherein the bracket member is shape-fitted with the mounting nut and attached to the inner surface of the pack cover.

10. The battery pack according to claim 3,
wherein the module case includes a base plate located at a lower portion of the battery cells to support the battery cells, and
wherein the base plate has a flow path provided therein so that a coolant flows therethrough.

11. The battery pack according to claim 10,
wherein the pack cover further includes a cooling pipe embedded therein along an edge region thereof,
wherein the base plate includes a cooling water port configured to communicate with the flow path and formed to extend vertically, and
wherein the cooling water port is directly connected to the cooling pipe in an upper and lower direction.

12. The battery pack according to claim 1,
wherein the plurality of battery modules are arranged in two rows such that the electrode terminals thereof are disposed to face each other based on a center portion of the pack case.

13. A vehicle, comprising the battery pack according to claim 1.

14. The battery pack according to claim 8, wherein the inter-bus bar is on the second side of the terminal connection unit so that the bracket member is interposed between the inter-bus bar and the inner surface of the pack cover.

15. The battery pack according to claim 9, wherein the mounting nut is recessed into the bracket member.

* * * * *